(12) United States Patent
Jeung (10) Patent No.: US 8,232,755 B2
(45) Date of Patent: Jul. 31, 2012

(54) MOTOR WITH CIRCUITS FOR PROTECTING MOTOR FROM INPUT POWER OUTAGES OR SURGES

(76) Inventor: Young-Chun Jeung, Cypress, CA (US)

(*) Notice: Subject to any disclaimer, the term of this patent is extended or adjusted under 35 U.S.C. 154(b) by 541 days.

(21) Appl. No.: 12/417,506

(22) Filed: Apr. 2, 2009

(65) Prior Publication Data
US 2010/0253266 A1 Oct. 7, 2010

(51) Int. Cl.
*H02P 6/14* (2006.01)
*G05B 11/28* (2006.01)

(52) U.S. Cl. ........... 318/400.26; 318/599; 318/400.3; 318/778; 318/779; 388/811; 327/540; 327/538; 323/201; 323/204; 323/299; 363/135; 363/138; 363/139; 363/34; 363/37; 363/41; 363/74; 363/56.03

(58) Field of Classification Search .......... 318/599, 318/400.3, 778, 779, 400.26; 388/811; 327/540, 327/538; 323/201, 204, 299; 700/177; 363/135, 363/138, 139, 34, 37, 41, 74, 56.03
See application file for complete search history.

(56) References Cited

U.S. PATENT DOCUMENTS

| | | | |
|---|---|---|---|
| 3,299,335 A | 1/1967 | Wessels | |
| 3,444,406 A | 5/1969 | Aha | |
| 3,457,486 A | 7/1969 | Soeda | |
| 3,531,702 A | 9/1970 | Hill | |
| 3,604,960 A | 9/1971 | Krestel | |
| 3,787,014 A | 1/1974 | Story et al. | |
| 3,878,809 A | 4/1975 | Ray | |
| 4,004,202 A | 1/1977 | Davis | |
| 4,271,385 A | 6/1981 | Azusawa | |
| 4,384,224 A | 5/1983 | Spitler et al. | |
| 4,389,606 A | 6/1983 | Detering | |
| 4,544,856 A | 10/1985 | King | |
| 4,642,885 A | 2/1987 | King | |
| 4,668,898 A | 5/1987 | Harms et al. | |
| 4,712,030 A | 12/1987 | Lakin et al. | |
| 4,774,448 A | 9/1988 | Yoshitomi | |
| 4,888,530 A | 12/1989 | Radik et al. | |
| 5,243,732 A | 9/1993 | Koharagi et al. | |
| 5,483,141 A * | 1/1996 | Uesugi | 318/811 |
| 5,492,273 A | 2/1996 | Shah | |
| 5,559,407 A | 9/1996 | Dudley et al. | |
| 5,663,616 A | 9/1997 | Stringfellow et al. | |
| 5,680,021 A | 10/1997 | Hollenbeck | |

(Continued)

FOREIGN PATENT DOCUMENTS
FR 2 896 638 A 7/2007
(Continued)

*Primary Examiner* — Rita Leykin
(74) *Attorney, Agent, or Firm* — Knobbe Martens Olson & Bear, LLP (57) ABSTRACT

A DC motor is provided. The DC motor prevents rush or overload of current in the DC motor during and/or after power input irregularities to the DC motor. A control circuit of the DC motor is configured to control current provided to the DC motor. When power irregularities in the power input to the DC motor are detected by the control circuit, the control circuit stops generating PWM (Pulse Width Modulated) signals and stops the current provided to the DC motor. After the stoppage of PWM signals, the control circuit can perform a soft-start of the PWM signals when the power irregularities are no longer detected. The soft starting of the PWM signals generates gradual increase in current to the DC motor, thus, preventing sudden rush of current that cause malfunction of the DC motor.

18 Claims, 4 Drawing Sheets

U.S. PATENT DOCUMENTS

| | | | |
|---|---|---|---|
| 5,739,614 A | 4/1998 | Suzuki et al. | |
| 5,767,635 A | 6/1998 | Steffens et al. | |
| 5,818,194 A | 10/1998 | Nordby | |
| 6,209,622 B1 | 4/2001 | Lagace et al. | |
| 6,310,452 B1 | 10/2001 | Deck et al. | |
| 6,369,536 B2 | 4/2002 | Beifus et al. | |
| RE38,406 E | 1/2004 | Faris et al. | |
| 6,801,013 B2 | 10/2004 | Woodward et al. | |
| 6,850,047 B2 * | 2/2005 | Itabashi et al. | 323/284 |
| 6,864,657 B1 | 3/2005 | Lungu | |
| 6,906,503 B2 * | 6/2005 | Lopez-Santillana et al. | 323/283 |
| 6,924,611 B1 | 8/2005 | Tzeng et al. | |
| 6,952,088 B2 | 10/2005 | Woodward et al. | |
| 7,015,663 B1 | 3/2006 | Tzeng et al. | |
| 7,042,180 B2 | 5/2006 | Terry et al. | |
| 7,042,692 B2 * | 5/2006 | Ueki et al. | 361/143 |
| 7,131,398 B2 | 11/2006 | Cohen et al. | |
| 7,268,505 B2 | 9/2007 | Pant et al. | |
| 7,272,302 B2 | 9/2007 | Woodward et al. | |
| 7,296,753 B1 | 11/2007 | Zucker | |
| 7,317,292 B2 * | 1/2008 | Iura et al. | 318/434 |
| 7,327,118 B2 | 2/2008 | Pant et al. | |
| 7,378,821 B2 | 5/2008 | Simpson, III | |
| 7,443,119 B2 | 10/2008 | Liu | |
| 7,458,228 B2 | 12/2008 | Lagace et al. | |
| 7,590,334 B2 | 9/2009 | Yabusaki et al. | |
| 7,657,161 B2 | 2/2010 | Jeung | |
| 7,882,371 B2 * | 2/2011 | Yano | 713/300 |
| 2002/0047348 A1 | 4/2002 | Ohiwa et al. | |
| 2003/0001442 A1 | 1/2003 | Hsu | |
| 2003/0080772 A1 | 5/2003 | Giacomini et al. | |
| 2003/0173924 A1 | 9/2003 | Blase et al. | |
| 2004/0232871 A1 | 11/2004 | Deck et al. | |
| 2005/0029976 A1 | 2/2005 | Terry et al. | |
| 2005/0162108 A1 | 7/2005 | Pant et al. | |
| 2005/0253744 A1 | 11/2005 | Kern | |
| 2006/0291820 A1 | 12/2006 | Kobayashi | |
| 2007/0024250 A1 | 2/2007 | Simpson, III | |
| 2007/0247091 A1 | 10/2007 | Maiocchi | |
| 2008/0084171 A1 | 4/2008 | Leehey et al. | |
| 2009/0039807 A1 | 2/2009 | Yabusaki et al. | |
| 2009/0039820 A1 | 2/2009 | Milano et al. | |
| 2009/0134823 A1 | 5/2009 | Jeung | |
| 2009/0134827 A1 | 5/2009 | Jeung | |
| 2009/0136220 A1 | 5/2009 | Jeung | |
| 2009/0136359 A1 | 5/2009 | Jeung | |
| 2009/0136360 A1 | 5/2009 | Jeung | |
| 2009/0137199 A1 | 5/2009 | Jeung | |
| 2009/0218968 A1 | 9/2009 | Jeung | |
| 2009/0218971 A1 | 9/2009 | Jeung | |
| 2009/0224709 A1 | 9/2009 | Jeung | |
| 2009/0267549 A1 | 10/2009 | Kitagawa | |
| 2009/0284201 A1 | 11/2009 | Jeung | |
| 2009/0315494 A1 | 12/2009 | Jeung et al. | |
| 2009/0315496 A1 | 12/2009 | Jeung et al. | |
| 2009/0315497 A1 | 12/2009 | Jeung et al. | |
| 2009/0315498 A1 | 12/2009 | Jeung et al. | |
| 2010/0039055 A1 | 2/2010 | Jeung | |
| 2010/0039058 A1 | 2/2010 | Jeung | |

FOREIGN PATENT DOCUMENTS

| | | |
|---|---|---|
| JP | 03248248 B2 | 1/2002 |
| JP | 2004-023823 A | 1/2004 |
| JP | 2004-56887 A | 2/2004 |
| JP | 2004-304928 A | 10/2004 |
| JP | 2005-168241 A | 6/2005 |
| KR | 10-2006-0115930 A | 11/2006 |
| KR | 10-0696854 B1 | 3/2007 |
| KR | 10-2008-0019807 A | 3/2008 |
| WO | 2009-111503 A2 | 9/2009 |
| WO | 2009-140419 A2 | 11/2009 |
| WO | 2009-158359 A2 | 12/2009 |

* cited by examiner

MOTOR WITH CIRCUITS FOR PROTECTING MOTOR FROM INPUT POWER OUTAGES OR SURGES

BACKGROUND

1. Field

The present disclosure relates to an electric motor and, more particularly, to a brushless electric DC motor.

2. Description of Related Technology

A switch to start and stop an operation of an AC (alternating current) motor has been widely used. However, in an ECM (electronically commutated motor), more particularly, a brushless DC (direct current) electric motor, instability can occur when there are power input irregularities. The motor's control circuit uses logic level voltages to control the operation of the DC motor. When power input to the motor is irregular, the logic level voltage become irregular and the control circuit may generate incorrect control signals.

SUMMARY

One aspect of the invention provides a motor apparatus. The motor apparatus comprises: a DC motor comprising a stator and a rotor; an AC to DC converter configured to receive an AC power input and to convert the AC power input to a DC power; a PWM signal generator configured to generate PWM signals; a power switching circuit configured to generate a PWM switched power using the DC power and the PWM signals, and to supply the PWM switched power to the DC motor; and an input power irregularity detector configured to detect irregularities in the AC power input and to send a control signal to the PWM signal generator, wherein upon receiving the control signal the PWM signal generator is configured to stop generating the PWM signals and then restart generating a new set of PWM signals.

In the foregoing system, the input power irregularity detector may comprise a surge detecting circuit configured to detect surges in the AC power input, wherein the input power irregularity detector is configured to send the control signal upon detecting of at least one surge in the AC power input that is greater than a predetermined value. The input power irregularity detector may be configured to send the control signal upon detecting of more than one surge during a predetermined time period. The PWM signal generator may be configured to restart generating the new set of PWM signals when no surges are detected for a predetermined time period after stoppage of generating the PWM signals. The predetermined time period may be 5 sec or longer.

Still in the foregoing system, the input power irregularity detector may comprise an outage detecting circuit configured to detect an outage of the AC power input that is longer than a predetermined time period, wherein the input power irregularity detector is configured to send the control signal upon detecting of an outage of the AC power input that is longer than the predetermined time period. The predetermined time period may be 0.2 msec or longer. The outage detecting circuit may be configured to detect an outage of the AC power input that is shorter than a predetermined period, wherein the input power irregularity detector is configured to send the control signal upon detecting of an outage of the AC power input that is shorter than the predetermined period. The input power irregularity detector may be configured to send the control signal upon detecting of an outage of the AC power input that is shorter than 10 sec. The input power irregularity detector may comprise an outage detecting circuit configured to detect low values in the AC power input that is lower than a predetermined value or substantially zero, wherein the input power irregularity detector is configured to send the control signal upon detecting of low values in the AC power input that is lower than a predetermined value. The AC power input and the DC power may be in voltage. The system may further comprise a voltage dividing circuit connected to the AC power input and configured to scale down the AC power input to a logic circuit voltage level, wherein the input power irregularity detector monitors the scale-down version of the AC power input.

Another aspect of the invention provides a method of operating a motor apparatus. The method comprises: providing a motor apparatus comprising a DC motor comprising a stator and a rotor, an AC to DC converter, an input power irregularity detector, a PWM signal generator, and a power switching circuit; generating PWM signals at the PWM signal generator; converting an AC power input to a DC power at the AC to DC converter; generating a PWM switched power using the DC power and the PWM signals at the power switching circuit; supplying the PWM switched power to the DC motor; detecting irregularities in the AC power input at the input power irregularity detector; stopping to generate the PWM signals upon detecting at least one irregularity in the AC power input; and subsequent to stopping, restarting to generate a new set of PWM signals.

In the foregoing method, the input power irregularity detector may comprise a surge detecting circuit, wherein detecting irregularities comprises detecting at least one surge in the AC power input that is greater than a predetermined value. Stopping to generate PWM signals may occur upon detecting of more than one surge during a predetermined time period. Generating the new set of PWM signals may be restarted when no surges are detected for a predetermined time period after stoppage of generating the PWM signals. The predetermined time period may be 5 sec or longer. The input power irregularity detector may comprise an outage detecting circuit, wherein detecting irregularities comprises detecting an outage of the AC power input that is longer than a predetermined time period. The predetermined time period may be 0.2 msec or longer. The input power irregularity detector may monitor a scale-down version of the AC power input in a logic circuit voltage level.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

DC Motor with Power Irregularities

In an embodiment, a DC motor is provided. The DC motor prevents rush or overload of current during and/or after power input irregularities to the DC motor. The power irregularities include power outages and surges in the power input to the DC motor. A control circuit of the motor is configured to control current provided to the DC motor. When the power irregularities in the power input to the DC motor are detected, generation of PWM signals is stopped and the current supply to the DC motor is stopped. After the stoppage of PWM signals, the control circuit can perform a soft start of the PWM signals once the power irregularities are no longer detected. The soft starting of the PWM signals produces current to the DC motor that start from substantially zero and gradually increases, thus, preventing sudden rush of current. The soft start can reduce a rush of current in the circuit and can consequently protect the circuit from damage.

DC Motor

Figure 1:
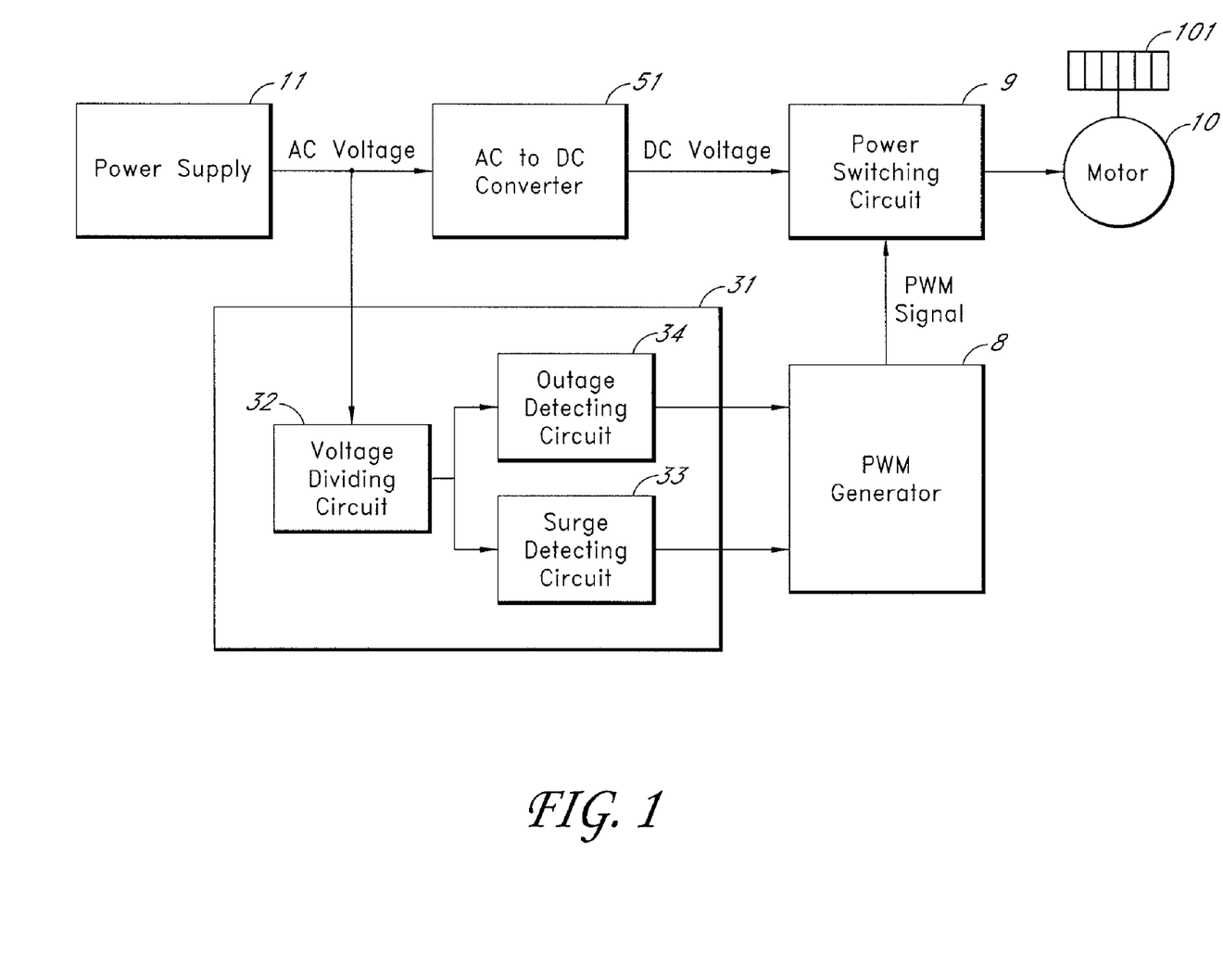
FIG. 1 illustrates a block diagram of an embodiment of a DC motor.
Figure 2:
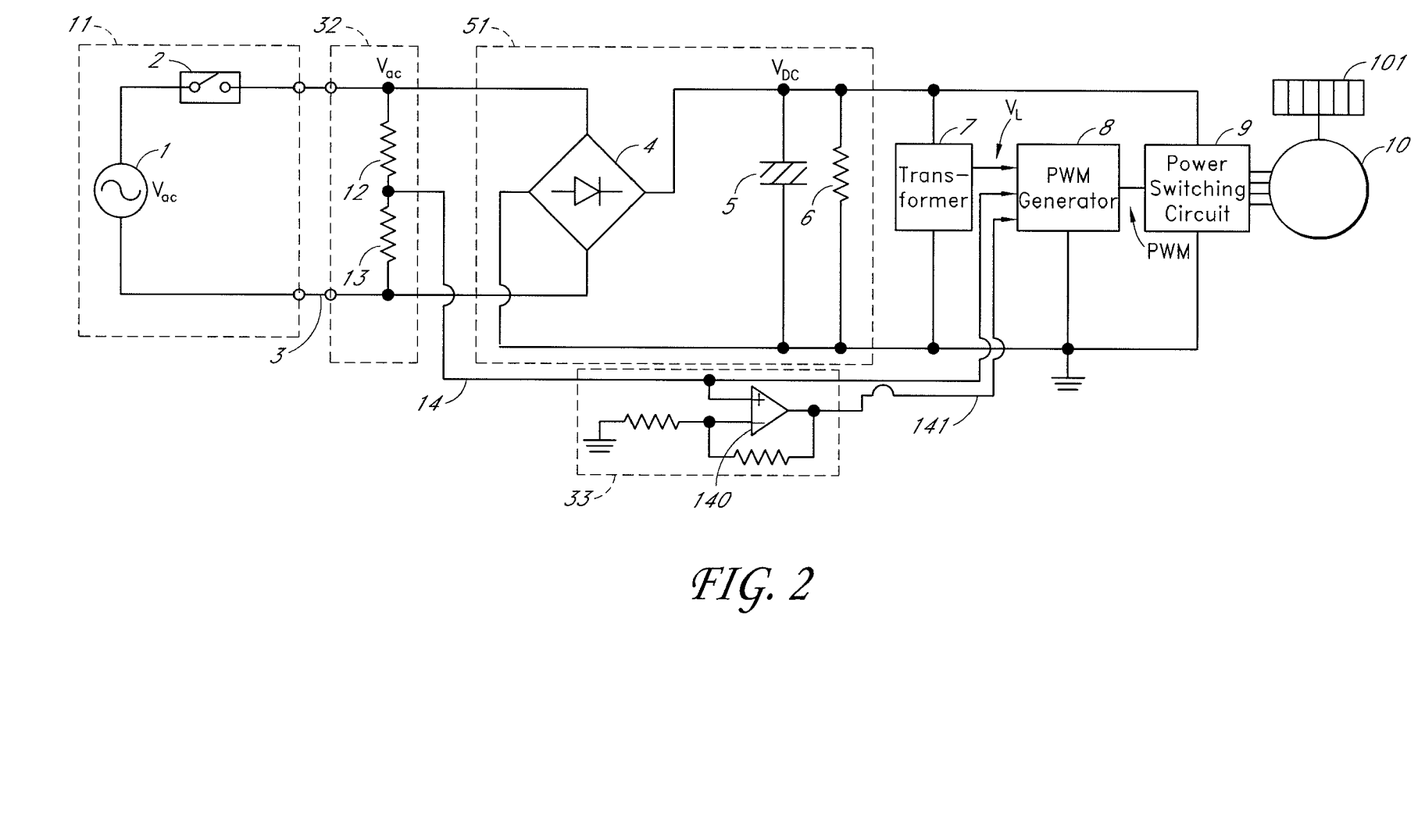
FIG. 2 illustrates a circuit diagram of an embodiment of a DC motor.

FIGS. 1 and 2 illustrate components of a DC motor in one embodiment. A DC motor 10 is connected to a power supply 11, an AC-to-DC converter 51, a power irregularity detector 31, a PWM generator 8, and a power switching circuit 9. Throughout the disclosure, the term "DC motor" may refer to the motor 10 only. Alternatively, the term refers to all the components as shown in FIGS. 1 and 2 that are enclosed in a motor a housing.

In the illustrated embodiment of FIGS. 1 and 2, the DC motor 10 receives current from the power switching circuit 9 and performs work. Although not illustrated, the DC motor 10 includes a rotor and a stator. In one embodiment, a plurality of position sensors are included in the DC motor 10 to sense the position of the rotor. The plurality of sensors are connected to the PWM generator and the PWM generator 8 can be configured to monitor and control the speed of rotation of the rotor. In some embodiments, the DC motor 10 can be a brushless electric motor. The DC motor can perform work on a load 101. In some embodiments, the DC motor 10 can perform work as a blower or a fan of an HVAC (heating, ventilation, and air conditioning) system.

Power Supply

In the illustrated embodiment of FIGS. 1 and 2, the power supply 11 is configured to provide power to components of the DC motor. Specifically, the power supply 11 provides power to the DC motor 10 through the AC-to-DC converter 51 and the power switching circuit 9. Referring to FIG. 2, the power supply 11 includes an AC power source 1 and a switch 2. The power source 1 can be a conventional electrical outlet or a portable power source, such as a battery or a fuel cell but is not limited thereto. In one embodiment, the switch 2 is an electrical switch configured to turn on and off power provided by the power supply 11. The AC power provided by the power supply 11 can be from about 5 volts to about 300 volts, such as about 110 volts and about 220 volts but is not limited thereto.

AC-to-DC Converter

In the illustrated embodiment of FIGS. 1 and 2, the AC-to-DC converter 51 is configured to convert AC power from the supply 11 into DC power. Referring to FIG. 1, the AC-to-DC converter 51 receives AC power from the power supply 11 and to converts the AC power to DC power. Referring to FIG. 2, the AC-to-DC converter 51 includes a converter diode 4, a condenser 5, and a condenser resistor 6. The AC power from the power supply 11 is provided to the converter diode 4 via the AC power line 21. The converter diode 4 converts an AC power signal from the power supply 11 to a non-AC power signal. The power signal from the converter diode 4 can charge the condenser 5. When fully charged, the condenser 5 maintains a DC voltage that is substantially constant. The condenser 5 can have a capacitance from about 100 mF to about 2000 mF, such as from about 250 mF to about 1000 mF although not limited thereto. The condenser 5 discharges when no power is provided to the condenser 5. When there is no power provided to the condenser 5, the condenser 5 can be completely discharged within a time period from about 1 millisecond to about 10 seconds, such as from about 10 milliseconds to about 5 seconds depending upon its design.

Power Irregularity Detector

In the illustrated embodiment of FIGS. 1 and 2, the power irregularity detector 31 receives the AC power from the power supply 11 and converts the AC power into a logic level AC voltage. The logic level AC voltage is used to detect voltage outage and/or surge in the AC power from the power supply 11. The power irregularity detector 31 includes a voltage dividing circuit 32, a surge detecting circuit 33, and an outage detecting circuit 34.

Voltage Dividing Circuit

As shown in FIGS. 1 and 2, the voltage dividing circuit 32 receives the AC power from the power supply 11 and provides a scaled-down version of the AC power. For example, the voltage diving circuit 32 scales down the AC power at about 110 or 220 volts into logic level AC voltages with the amplitude of about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18, about 18.5, about 19, about 19.5, and about 20 volts.

When zero power is provided to the voltage dividing circuit 32, the voltage dividing circuit 32 provides zero power or voltage. As shown in FIG. 2, the voltage dividing circuit 32 includes a pair of resistors 12 and 13. The resistors 12 and 13 are serially connected and a voltage division line 14 is drawn out from between the resistors 12 and 13. The logic level AC voltages are provided to other components of the DC motor via the voltage division line 14. In some embodiments, a ratio of values of resistances for resistors 12 and 13 can be between about 30 to 1 and about 40 to 1. In some embodiments, the sum of the values of resistances of resistors 12 and 13 can be from about 1 M (mega) ohm to about 100 M ohm, such from about 2 M ohm to about 10 M ohm. However, the ratios and the values of the resistors 12 and 13 can be designed in various configurations to provide a desired log level voltage via the voltage division line 14.

Outage Detecting Circuit

Referring to FIG. 1, the outage detecting circuit 34 detects power outage or substantially zero power from the scaled-down voltage at the voltage division line 14. When an outage of the power is detected, the outage detecting circuit 34 sends a stop signal to the PWM generator 8 to stop generating or outputting the PWM signals from the PWM generator 8. In an embodiment, when the outage detecting circuit 34 detects substantially non-zero power or regular power from the voltage dividing circuit 32, the outage detecting circuit 34 sends a soft-start signal to the PWM generator 8 for soft-starting PWM signals. In another embodiment, the outage detecting circuit 34 can directly receive the AC power from the power supply 11 and detect power outages. In one embodiment, the soft-start signal is sent immediately after detecting non-zero or regular power. In another embodiment, the soft-start signal is sent some time after detecting non-zero or regular power.

In the embodiment of FIG. 2, the outage detecting circuit 34 is simply a wire 14 connecting between the voltage dividing circuit 32 and the PWM generator 8. In this embodiment, the logic level AC voltage signals from the voltage diving circuit 32 constitute both stop and soft-start signals to the PWM generator 8. The outage or substantially zero voltage corresponds to the stop signal, and resuming of the logic level AC voltage corresponds to the soft-start signal.

Surge Detecting Circuit

As shown in FIGS. 1 and 2, the surge detecting circuit 33 is connected to the voltage dividing circuit 32 and receives the logic level AC voltage via the voltage division line 14. The surge detecting circuit 33 is configured to generate a surge signal when there is a surge in the logic level AC voltage from the voltage dividing circuit 32. In another embodiment, the surge detecting circuit 33 can directly receive the AC power from the power supply 11 and generate a surge signal for each surge in the AC power from the power supply 11. In the illustrated embodiment of FIG. 2, the surge detecting circuit 33 includes an operational amplifier (OP amp) 140.

The OP amp 140 compares the voltage from the voltage diving circuit 32 against a pre-determined threshold voltage value. The OP amp 140 is configured to generate a surge signal if the voltage from the voltage dividing circuit 32 exceeds the pre-determined threshold voltage value. The pre-determined threshold voltage values can be logic level voltages and provided in view of the amplitude of the logic level voltage from the voltage dividing circuit 32. For example, the pre-determined threshold voltage is about 3, about 4, about 5, about 6, about 7, about 8, about 9, about 10, about 11, about 12, about 13, about 14, about 15, about 16, about 17, about 18, about 19, and about 20 volts. The surge signal from the surge detecting circuit 33 can be provided to the PWM generator 8 via a surge signal line 141.

DC Transformer

In the illustrated embodiment of FIG. 2, the DC transformer 7 receives the DC power from the AC-to-DC converter 51 and scales it down for the PWM generator 8. In some embodiments, the DC transformer 7 converts the DC power at about 110 or 220 volts to logic level DC voltages, such as about 3, about 4, about 5, about 6, about 7, about 8, about 9, about 10, about 11, about 12, about 13, about 14, about 15, about 16, about 17, about 18, about 19, and about 20 volts.

PWM Generator

In the illustrated embodiment of FIG. 2, the PWM generator receives logic level voltages from the transformer 7 and one or more signals from the power irregularity detector 31, and generates PWM (pulse-width-modulation) signals. Specifically, the PWM generator 8 receives control signals from the voltage dividing circuit 32 and the surge detecting circuit 33 and uses algorithms to determine conditions to reset the PWM signals. The PWM signals are provided to the power switching circuit 9. A skilled artisan would well appreciate the construction of the PWM generator 8.

In some embodiments, algorithms to control operations of the PWM generator 8 can be programmed into a firmware of the PWM generator 8. The PWM generator 8 can include a microprocessor, or a computing device.

Power Switching Circuit

In the illustrated embodiment of FIGS. 1 and 2, the power switching circuit 9 receives the DC power from the AC-to-DC converter 51 and switches it according to PWM signals from the PWM generator 8. The pulses of the PWM signal controls amount of current supplied to the DC motor 10 by the power switching circuit 9. When the pulses of the PWM signals are zero, the DC power provided by the power switching circuit 9 is zero, as well. PWM signals with narrow width pulses are configured to generate current for shorter time interval than the wider width pulses. The amount of current provided by the power switching circuit 9 is calculated as average amount of current supplied over a certain time interval. By producing gradually increasing width pulses of the PWM signals, the average amount of current provided by the power switching circuit 9 in a certain time interval is gradually increased.

When the PWM signal is stopped and soft-started by the control circuit 91, the PWM switched current is also stopped and soft-started. With the soft-starting of the PWM switched power a current "rush" can be prevented. This prevention can prevent damage and/or malfunction of the power switching circuit 9 and the DC motor.

AC Power with Irregularities

Figures 3A, 3B:
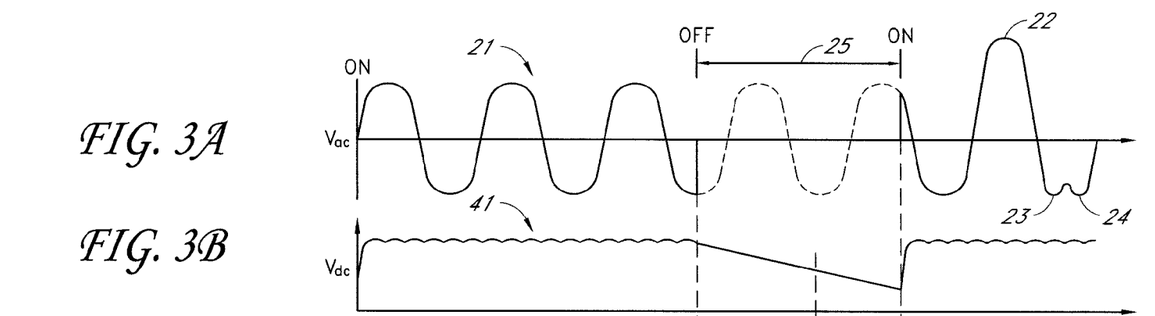
FIGS. 3A-3G show graphs of voltage input, PWM signal, and current generated by a DC motor according to an embodiment without a soft-start.
Figure 4A:
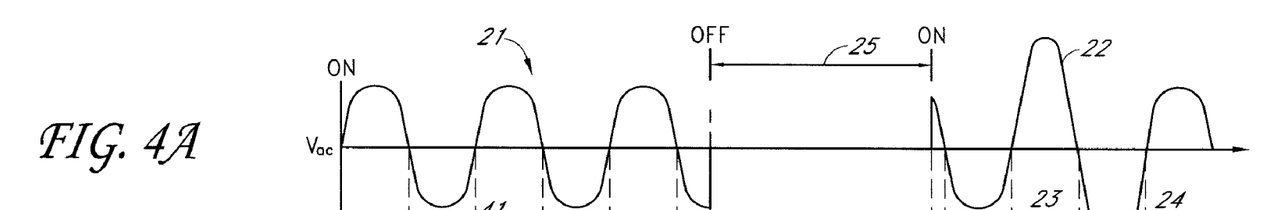
FIGS. 4A-4F show graphs of voltage input, PWM signal, and current generated by a power switching circuit in a DC motor according to one embodiment with a soft-start.

FIGS. 3A and 4A illustrate exemplary AC voltage signals 21 supplied by the power supply 11. The interval 25 between "Off" and "On" positions represents a time period of power outage. Position "Off" refers to a power outage and no AC power being supplied by the power supply 11. Position "On" refers to the AC power being back on after the power outage. In FIGS. 3A and 4A, the AC voltage signal 21 also includes power surges 22, 23, and 24 to the right of the "on" position.

DC Power Converted from AC Power with Irregularities

Figures 4B, 4C:
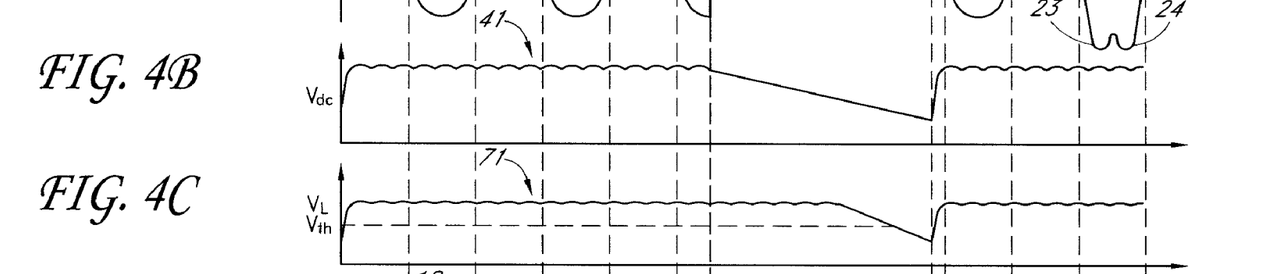

FIG. 3B and 4B illustrate DC voltage signal 41 changes at the condenser 5 of the AC-to-DC converter 51. When regular AC power is provided to the AC-to-DC converter 51, the condenser 5 is fully charged and maintains a substantially constant DC voltage level. When there is an AC power outage, such as at the "Off" position, the DC voltage 41 at the condenser 5 starts to decrease. Upon the AC power being back on in the "On" position, the condenser 5 is charged back to substantially same voltage level before the "Off" position.

Logic Level DC Power Signals

Figure 3C:
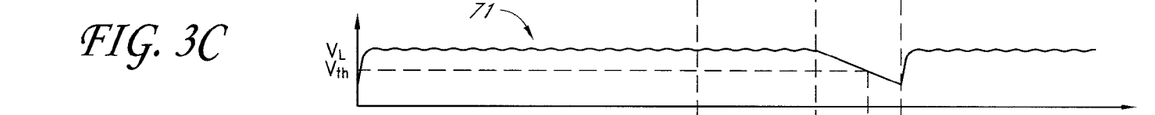

FIGS. 3C and 4C illustrate a logic level DC voltage signal 71 that is outputted by the transformer 7 to power the logic circuit of the PWM generator 8. The logic level DC voltage 71 is maintained without decline for a period of time even after the "Off" position. During this initial time period, the DC power input 41 to the transformer 7 decreases; however, the DC power 41 is still high enough to maintain the logic level DC voltage 71. After this initial period, the DC power 41 supplied to the transformer 7 becomes too low to maintain the logic level DC voltage 71 and therefore the logic level DC voltage 71 starts to decline. As the DC power input 41 falls further below, the logic level DC voltage 71 decreases below a threshold logic level DC voltage ($V_{th}$) for the PWM generator 8 to operate normally. The horizontal dashed line of FIGS. 3C and 4C represents the threshold logic level DC voltage ($V_{th}$). When the power outage 21 in the AC power 21 becomes longer, the logic level DC voltage 71 falls below the threshold value, as illustrated in these drawings.

PWM Signals Without Soft-Start

Figure 3D:
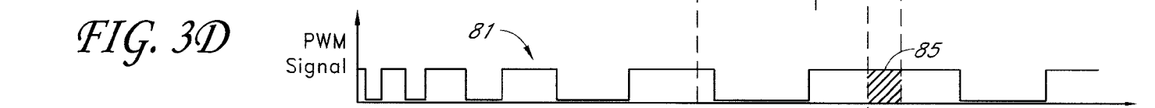

FIG. 3D illustrates PWM signal 81 outputted from the PWM generator 8 in one embodiment without a soft-start. In the illustrated embodiment, in response to the power outage, the PWM generator 8 stops generating the PWM signal 81 when the logic level DC voltage 71 falls below the threshold value. The hatched rectangular window 85 of FIG. 3D represents a time period from when the logic level DC voltage 71 falls below the threshold logic level DC voltage value and to when the logic level DC voltage 71 comes back above the threshold logic level DC voltage value. The PWM generator 8 stops working during this time period.

After the time period, the PWM signal 81 from the PWM generator 8 becomes unpredictable. Depending upon logic values stored in the PWM generator 8 when the logic level DC voltage 71 falls below the threshold level, the PWM generator 8 may continue the pulse 85 as if there was no power outage. In the illustrated example of FIG. 3D, the PWM signal 81 stop as a high pulse and start again as high a pulse before and after this time period. In other situations, the PWM signal 8 may stop as a low pulse and start again as a low pulse, stop as a low pulse and start as a high pulse, or stop as a high pulse and start again as a low pulse. In some situations, widths of the pulses of the PWM signal 81 can vary before and after the time period as well.

Current Supplied to Motor Without Soft-Start

Figures 3E, 3F:
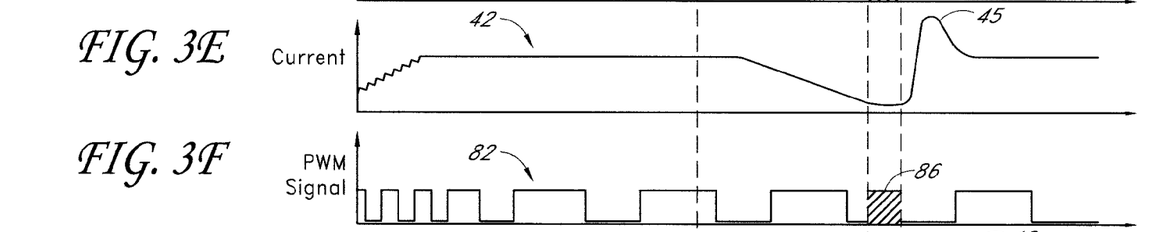

FIG. 3E illustrates current 42 generated at the power switching circuit 9 when the PWM signal 81 is provided to the power switching circuit 9. As discussed above, the current 42 from the power switching circuit 9 is outputted when the power switching circuit 9 receives the DC power from the AC-to-DC converter 51 and switches it according to PWM signals from the PWM generator 8. In FIG. 3E, when there is a power outage, the current 42 starts to decline as the DC voltage signal 41 of FIG. 3B starts to decline at the "off" position. The current 42 continues to decline until after the "On" position. When the DC voltage signal 41 comes back to normal value after the "On" position, because the PWM signal 81 is provided as a high pulse, the power switching circuit 9 outputs a rush or overload of current 45. This is because the width of the pulse of the PWM signal 81 is wide enough to generate a sudden output of substantially high amount of current from the power switching circuit 9. This rush current 45 can lead to damage or malfunction of the DC motor.

Another Example of PWM Signals and Current Without Soft-Start

Figure 3G:
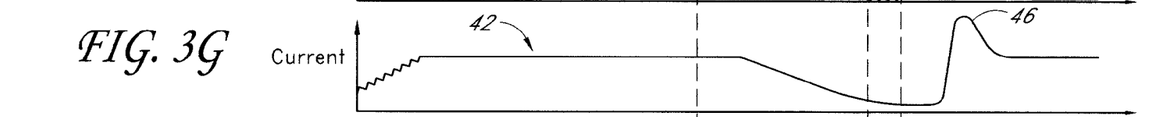

FIG. 3F illustrates another PWM signal 82 outputted from the PWM generator 8. The hatched rectangular window 86 of FIG. 3F represents a time period from when the logic level DC voltage 71 falls below the threshold logic level DC voltage value to when the logic level DC voltage 71 comes back above the threshold logic level DC voltage value. In this example, the PWM signals 82 stop as a low pulse and start again as a low pulse in the time period. The PWM signal 82 outputs a high pulse some time after the logic level DC voltage 71 comes back above the threshold logic level DC voltage value FIG. 3G illustrates current 42 generated by the power switching circuit 9 in response to the PWM signal 82. In this example, current is outputted immediately after the "On" position since the PWM signal 82 is a low pulse. However, a rush current 46 occurs when the DC voltage signal 41 is back to normal and the PWM signal 82 becomes a high pulse sometime after the "On" position. This is because the width of the first PWM pulse after the time window 86 is wide enough to generate a sudden output of substantially high amount of current from the power switching circuit 9. This rush current 46 can lead to damage or malfunction of the DC motor.

Logic Level AC Voltage

Figure 4D:
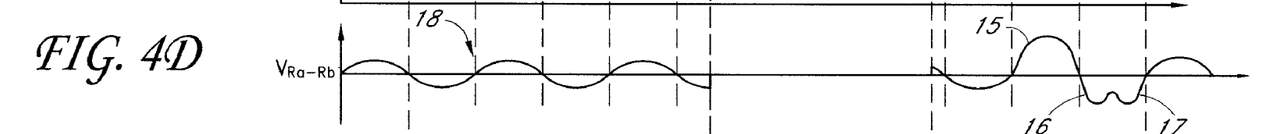

FIG. 4D illustrates scaled-down AC voltage signal 18 outputted by the voltage dividing circuit 32. The scaled-down AC voltage signal 18 is scaled-down version of the AC voltage signal from the power supply 11 to the voltage dividing circuit 32. The scaled-down AC voltage signal 18 includes zero voltage signal corresponding to the power outage 25 of FIG. 4A. The scaled-down AC voltage signal 18 also includes surges 15, 16, and 17 corresponding to surges 22, 23, and 24 of FIG. 4A.

PWM Signals with Soft-Start in Response Power Outage

Figures 4E, 4F:
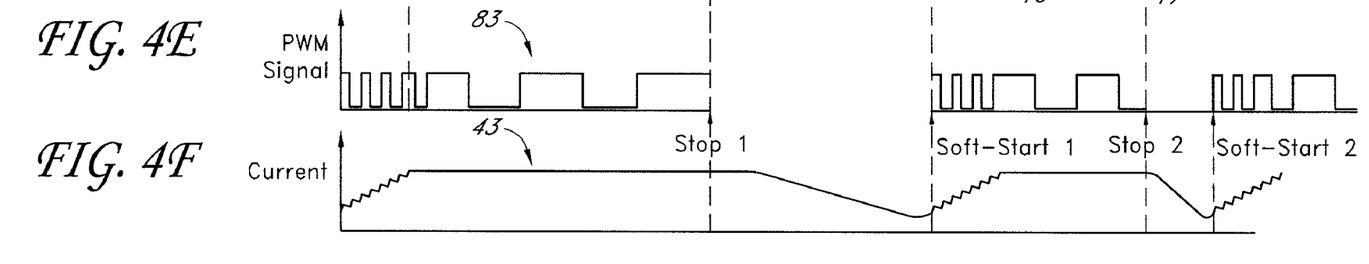

FIG. 4E illustrates PWM signal 83 outputted from the PWM generator 8 in one embodiment with a soft-start. In the illustrated embodiment of FIG. 4E, if the scaled-down AC voltage signal 18 becomes zero or substantially zero, then the PWM generator 8 stops generating or outputting PWM signals 83 as in "Stop 1" position. In one embodiment where the power irregularity detector 31 (FIG. 1) includes the outage detecting circuit 34, this circuit 34 sends a stop signal to the PWM generator 8 to stop generating or outputting the PWM signal 83.

In one embodiment, if the scaled-down AC voltage signal 18 becomes zero or substantially zero for longer than a predetermined period, then the PWM generator 8 stops generating or outputting PWM signals 83 after that predetermined time from first detecting the power outage. In one embodiment, the outage detecting circuit 34 sends the stop signal in a predetermined time after first detecting of the power outage. In another embodiment, the outage detecting circuit 34 sends the stop signal only when the power outage becomes longer than a predetermined time.

In embodiments, the predetermined time is about 0.05 msec., about 0.06 msec., about 0.07 msec., about 0.08 msec., about 0.09 msec., about 0.1 msec., 0.11 msec., about 0.12 msec., about 0.13 msec., about 0.14 msec., about 0.15 msec., about 0.16 msec., 0.17 msec., about 0.18 msec., about 0.19 msec., about 0.2 msec., 0.21 msec., about 0.22 msec., about 0.23 msec., about 0.24 msec., about 0.25 msec., about 0.26 msec., 0.27 msec., about 0.28 msec., about 0.29 msec., about 0.3 msec., 0.31 msec., about 0.32 msec., about 0.33 msec., about 0.34 msec., about 0.35 msec., about 0.36 msec., 0.37 msec., about 0.38 msec., about 0.39 msec., about 0.4 msec.

In embodiments, when the PWM generator 8 receives a signal that the power outage is over, the PWM generator is configured to perform a soft-start of the PWM signals as in position "Soft-Start 1." In soft-starting, the PWM generator 8 sends a new set of PWM signals to the power switching circuit 9. The new set of PWM signals are pulse signals with pulse widths that start from initially narrow widths to wider widths over time.

Current Supplied to Motor with Soft-Start in Response to Power Outage

FIG. 4F illustrates current 43 supplied to the motor 10 from the power switching circuit 9 in one embodiment with a soft start. In FIG. 4E, the PWM signal 83 stops when there is an AC power outage or when such power outage is longer than a predetermined period. Then, when the power outage is over, the PWM signal 83 starts fresh or soft-started as shown in the "Soft-Start 1" position. The soft-started PWM signal 83 begins with narrow width pulses and gradually include wider width pulses. Thus, receiving the DC power 41 and the PWM signal 83, the power switching circuit 9 generates current 43 that increases as if the motor 10 is turned on fresh. By soft-starting the current 43 gradually increases without substantial current rush as shown in FIGS. 3E and 3G.

PWM Signals with Soft-Start and Current in Response to Power Surges

Further in the illustrated embodiment of FIG. 4E, the PWM signal 83 soft-starts in response to certain level of surges. As discussed above referring to FIGS. 1 and 2, the surge detecting circuit 33 detects surges within the scaled-down AC voltage signal 18. When at least one surge 22, 23, 24 is detected, the surge detecting circuit 33 sends a surge signal to the PWM generator 8, which then stops generating or outputting PWM signals from the PWM generator 8 as in "Stop 2" position. In some embodiments, the PWM generator 8 reacts to soft-start PWM signals 83 at "Soft-Start 2" when there is more than one surge signal from the surge detecting circuit 33. Accordingly, referring to FIG. 4F, the current 43 also includes a decline at "Stop 2" and a gradual increase after the "Soft-Start 2" position.

In the illustrated embodiment of FIG. 4E, the PWM generator 8 soft-starts the PWM signals after detecting three surges, 15, 16, and 17. In embodiments, the PWM generator 8 soft-starts after detecting 1, 2, 3, 4, 5, 6, 7, 8, 9 or 10 surges. In some embodiments, the PWM generator 8 soft-starts outputting PWM signal 83 when there is no surge for a predetermined period of time as in "Soft-Start 2" position. In embodiments, the predetermined time period is about 0.5 sec., about 1 sec., about 1.5 sec., about 2 sec., about 2.5 sec., about 3 sec., about 3.5 sec., about 4 sec., about 4.5 sec., about 5 sec., about 5.5 sec., about 6 sec., about 6.5 sec., about 7 sec., about 7.5 sec., about 8 sec., about 8.5 sec., about 9 sec., about 9.5 sec., about 10 sec., about 10.5 sec., about 11 sec., about 11.5 sec., about 12 sec., etc.

In embodiment, power surges are defined as those including deviations of the voltage that are greater than about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, and about 30% from the regular amplitude of the logic level AC voltage.

What is claimed is:

1. A motor apparatus comprising:
   a DC motor comprising a stator and a rotor;
   an AC to DC converter configured to receive an AC power input and to convert the AC power input to a DC power;
   a PWM signal generator configured to generate PWM signals;
   a switching circuit configured to generate a PWM switched power using the DC power and the PWM signals, and to supply the PWM switched power to the DC motor;
   an input power irregularity detector configured to detect irregularities in the AC power input and to send a control signal to the PWM signal generator, wherein upon receiving the control signal the PWM signal generator is configured to stop generating the PWM signals and then restart generating a new set of PWM signals; and
   a voltage dividing circuit connected to the AC power input and configured to scale down the AC power input to a logic circuit voltage level, wherein the input power irregularity detector monitors the scale-down version of the AC power input.

2. The apparatus of claim 1, wherein the input power irregularity detector comprises a surge detecting circuit configured to detect surges in the AC power input, wherein the input power irregularity detector is configured to send the control signal upon detecting of at least one surge in the AC power input that is greater than a predetermined value.

3. The apparatus of claim 2, wherein the input power irregularity detector is configured to send the control signal upon detecting of more than one surge during a predetermined time period.

4. The apparatus of claim 2, wherein the PWM signal generator is configured to restart generating the new set of PWM signals when no surges are detected for a predetermined time period after stoppage of generating the PWM signals.

5. The apparatus of claim 4, wherein the predetermined time period is 5 sec or longer.

6. The apparatus of claim 1, wherein the input power irregularity detector comprises an outage detecting circuit configured to detect an outage of the AC power input that is longer than a predetermined time period, wherein the input power irregularity detector is configured to send the control signal upon detecting of an outage of the AC power input that is longer than the predetermined time period.

7. The apparatus of claim 6, wherein the predetermined time period is 0.2 msec or longer.

8. The apparatus of claim 1, wherein the input power irregularity detector is configured to detect an outage of the AC power input that is shorter than a predetermined period, wherein the input power irregularity detector is configured to send the control signal upon detecting of an outage of the AC power input that is shorter than the predetermined period.

9. The apparatus of claim 1, wherein the input power irregularity detector is configured to send the control signal upon detecting of an outage of the AC power input that is shorter than 10 sec.

10. The apparatus of claim 1, wherein the input power irregularity detector comprises an outage detecting circuit configured to detect low values in the AC power input that is lower than a predetermined value or substantially zero, wherein the input power irregularity detector is configured to send the control signal upon detecting of low values in the AC power input that is lower than a predetermined value.

11. The apparatus of claim 1, wherein the AC power input and the DC power are in voltage.

12. A method of operating a motor apparatus, the method comprising:
    providing a motor apparatus comprising:
      a DC motor comprising a stator and a rotor,
      an AC to DC converter,
      an input power irregularity detector,
      a PWM signal generator, and
      a switching circuit;
    generating PWM signals at the PWM signal generator;
    converting an AC power input to a DC power at the AC to DC converter;
    generating a PWM switched power using the DC power and the PWM signals at the switching circuit;
    supplying the PWM switched power to the DC motor;
    detecting irregularities in the AC power input at the input power irregularity detector;
    stopping to generate the PWM signals upon detecting at least one irregularity in the AC power input; and
    subsequent to stopping, restarting to generate a new set of PWM signals,
    wherein the input power irregularity detector monitors a scale-down version of the AC power input in a logic circuit voltage level.

13. The method of claim 12, wherein the input power irregularity detector comprises a surge detecting circuit, wherein detecting irregularities comprises detecting at least one surge in the AC power input that is greater than a predetermined value.

14. The method of claim 13, wherein stopping occurs upon detecting of more than one surge during a predetermined time period.

15. The method of claim 13, wherein generating the new set of PWM signals is restarted when no surges are detected for a predetermined time period after stoppage of generating the PWM signals.

16. The method of claim 15, wherein the predetermined time period is 5 sec or longer.

17. The method of claim 12, wherein the input power irregularity detector comprises an outage detecting circuit, wherein detecting irregularities comprises detecting an outage of the AC power input that is longer than a predetermined time period.

18. The method of claim 17, wherein the predetermined time period is 0.2 msec or longer.

* * * * *